(12) United States Patent
Murata

(10) Patent No.: US 8,740,460 B2
(45) Date of Patent: Jun. 3, 2014

(54) SEAL PLATE FOR A MOVEMENT GUIDE DEVICE

(75) Inventor: Tomozumi Murata, Tokyo (JP)

(73) Assignee: THK Co., Ltd., Tokyo (JP)

( * ) Notice: Subject to any disclaimer, the term of this patent is extended or adjusted under 35 U.S.C. 154(b) by 258 days.

(21) Appl. No.: 13/058,080

(22) PCT Filed: Aug. 12, 2009

(86) PCT No.: PCT/JP2009/003881
§ 371 (c)(1),
(2), (4) Date: Feb. 8, 2011

(87) PCT Pub. No.: WO2010/023836
PCT Pub. Date: Mar. 4, 2010

(65) Prior Publication Data
US 2011/0138942 A1 Jun. 16, 2011

(30) Foreign Application Priority Data
Aug. 28, 2008 (JP) ................. 2008-218951

(51) Int. Cl.
*F16C 33/00* (2006.01)
*F16C 29/06* (2006.01)
*F16J 15/34* (2006.01)

(52) U.S. Cl.
USPC .............................. 384/15; 384/43; 277/404

(58) Field of Classification Search
CPC ... F16J 15/3284; F16J 15/022; F16J 15/0812; F16J 15/324; F16J 15/444; F16J 15/064; F16J 15/3496; F61C 29/086; C09K 2200/0291; C09K 2200/0692; C09K 2200/0695

USPC .......... 74/110; 384/7, 13, 15, 43, 45; 277/345, 277/401, 404, 414, 650, 651, 935, 937
See application file for complete search history.

(56) References Cited

U.S. PATENT DOCUMENTS

| | | | |
|---|---|---|---|
| 2,590,017 A | 3/1952 | Knight | |
| 5,634,722 A | 6/1997 | Yuasa et al. | |
| 6,019,513 A * | 2/2000 | Tsukada et al. | 384/15 |
| 6,155,717 A * | 12/2000 | Michioka et al. | 384/15 |
| 6,705,430 B2 | 3/2004 | Michioka et al. | |
| 2004/0179757 A1* | 9/2004 | Yabe et al. | 384/7 |

FOREIGN PATENT DOCUMENTS

| | | |
|---|---|---|
| JP | 02-026370 A | 1/1990 |
| JP | 05-263946 A | 10/1993 |
| JP | 9-42284 A | 2/1997 |

(Continued)

OTHER PUBLICATIONS

International Search Report of PCT/JP2009/003881, date of mailing date Nov. 10, 2009.

*Primary Examiner* — Justin Krause
(74) *Attorney, Agent, or Firm* — Westerman, Hattori, Daniels & Adrian, LLP

(57) ABSTRACT

Provided is a seal plate (40) for a movement guide device that can be produced easily from optimal materials according to a usage environment of the movement guide device and can be produced simply at low cost. The seal plate (40) is mounted on a mobile block (2) that moves along a track rail (1) and closes a gap between the mobile block (2) and the track rail (1). The seal plate (40) includes a base material of a woven and knitted fabric or nonwoven fabric, and a binder component (40b) which is dispersed in the base material and partially binds together fibers (40a) which form the woven and knitted fabric or nonwoven fabric, and has a plurality of voids formed therein.

5 Claims, 3 Drawing Sheets

(56) References Cited

FOREIGN PATENT DOCUMENTS

| JP | 11-294451 A | 10/1999 |
|---|---|---|
| JP | 2000-227115 A | 8/2000 |
| JP | 2004-340362 A | 12/2004 |
| JP | 2007-283058 A | 11/2007 |

\* cited by examiner

SEAL PLATE FOR A MOVEMENT GUIDE DEVICE

TECHNICAL FIELD

The present invention relates to a seal plate for use in a movement guide device which includes a mobile block and a track rail movably assembled to each other via a plurality of rolling elements such as balls and rollers, and for closing a gap between the mobile block and the track rail.

BACKGROUND ART

In the movement guide device of this kind, when dust and foreign substances enter the gap between the track rail and the mobile block, the entry of dust and foreign substances causes the abnormal abrasion of the rolling elements and a rolling surface for these rolling elements, which in turn decreases the life of the device. Thus, dust-proof means is required to prevent the entry of dust and foreign substances through such a gap.

Conventionally, a seal member made of urethane rubber or the like is well known as such dust-proof means. The seal member is mounted on both sides of the mobile block in a moving direction and a tip of a lip portion provided on the seal member is brought into close contact with a surface of the track rail. The seal member is configured so that the lip portion removes dust and foreign substances deposited on the track rail as the mobile block moves, to thereby prevent those foreign substances from entering inside of the mobile block.

Conversely, there is a problem that the seal member molded from urethane rubber generates a large frictional force between the lip portion and the track rail, and hence in terms of ensuring smooth movement of the mobile block relative to the track rail, it is difficult to set extremely large pressure contact force of the lip portion relative to the track rail.

For this reason, as a structure suitable for a movement guide device for use in an environment in which many foreign substances are deposited on the track rail, a structure in which a plurality of the seal members are mounted on the mobile block in an overlapping state is also suggested (JP 09-42284 A).

On the other hand, JP 11-294451 A discloses a seal plate made of open cell polyurethane foam impregnated with lubricating oil. The seal plate is mounted on the mobile block under a state in which the seal plate is housed in a casing. The seal plate is configured to move with the mobile block while applying the impregnated lubricating oil to the track rail as the mobile block moves along the track rail, thereby wiping off foreign substances deposited on the track rail. The seal plate is self-lubricating relative to the track rail so that it is possible to smoothly move the mobile block relative to the track rail while improving close contact between the seal plate and the track rail, thereby obtaining high dust-proof effect.

Further, JP 2000-227115 A discloses a dust-proof device in which a plurality of the seal plates are brought into contact with the track rail in an overlapping state, thereby providing higher dust-proof effect.

CITATION LIST

Patent Literature

[PTL 1] JP 09-42284 A
[PTL 2] JP 11-294451 A
[PTL 3] JP 2000-227115 A

DISCLOSURE OF THE INVENTION

Problems to be Solved by the Invention

However, a seal member molded from urethane rubber is molded using a mold and at the same time adhered to a metal substrate for mounting on a mobile block. For this reason, there is a problem that in order to adapt the seal member to various types of movement guide devices, it is necessary to prepare a mold as required for the type of the movement guide device and it is costly and time consuming to produce the seal member. Further, if the movement guide device is used in a special environment in which high chemical resistance and heat resistance are needed, the seal member has a durability problem.

On the other hand, although the seal plate made of a foam impregnated with the lubricating oil is more easily produced compared to the above-mentioned rubber seal member, it also has a durability problem in a special environment in which high chemical resistance and heat resistance are needed.

Means for Solving the Problems

The present invention has been made in view of the above-mentioned problems, and an object of the present invention is to provide a seal plate for a movement guide device, which is capable of being produced easily from optimal materials according to an usage environment of the movement guide device and produced simply at low cost.

That is, the present invention provides a seal plate which is mounted on a mobile block which moves along a track rail and closes a gap between the mobile block and the track rail, the seal plate including: a base material of a woven and knitted fabric or nonwoven fabric; and a binder component which is dispersed in the base material and partially binds together fibers which form the woven and knitted fabric or nonwoven fabric, in which the seal plate has a plurality of voids formed therein.

Further, in the seal plate according to the present invention, the base material is made of one or more kinds of fibers selected from the group consisting of an aramid fiber, a glass fiber, a carbon fiber, a poly(p-phenylenebenzobisoxazole) (PBO) fiber, and a polyester fiber.

Further, the binder component in the seal plate according to the present invention is made of one or more kinds of rubbers selected from the group consisting of fluororubber, EPM, EPDM, hydrogenated nitrile rubber, silicone rubber, acrylic rubber, and butyl rubber.

Still further, the seal plate according to the present invention retains a lubricating oil in the plurality of voids formed therein.

Further, there is provided a movement guide device to which the seal plate according to the present invention is applied, the seal plate including: a plurality of rolling elements; a track rail along which a rolling surface for the plurality of rolling elements is provided in a longitudinal direction; a mobile block which is assembled to the track rail via the plurality of rolling elements; and a dust-proof member which is mounted on the mobile block and seals a gap between the mobile block and the track rail. The dust-proof member includes: the seal plate, which is formed into a plate-like shape and has a working surface conforming to an outer shape of the track rail to come into sliding contact with the track rail on the working surface; and a housing which houses the seal plate and is fixed to the mobile block.

Effects of the Invention

The seal plate according to the present invention includes the binder component dispersed in the base material of the woven and knitted fabric or nonwoven fabric so that the binder component partially binds together fibers which form the woven and knitted fabric or nonwoven fabric while maintaining the plurality of voids in the base material. Therefore, the seal plate has appropriate flexibility with respect to a compression direction thereof while improving shape-maintaining property thereof. Consequently, the seal plate according to the present invention is capable of keeping low pressure contact force to the track rail while improving close contact of the seal plate to the track rail, thereby ensuring not only a sufficient seal function but also smooth movement of the mobile block relative to the track rail. Further, even when the seal plate is kept into sliding contact with the track rail over a long period of time, the fibers which form the woven and knitted fabric or nonwoven fabric are not undesirably ragged to cause the seal plate to deform because crossing parts of the fibers are bound together by the binder component.

Further, in regard to the fibers which form the woven and knitted fabric or nonwoven fabric as the basic material and the binder component dispersed in the basic material, various materials can be selected depending on the intended use of the movement guide device. For example, if the movement guide device is to be used in a high temperature environment, the woven and knitted fabric or nonwoven fabric as the base material can be formed of, for example, an aramid fiber, which is excellent in heat resistance, whereas fluororubber, which is also excellent in heat resistance, can be selected as the binder component. Similarly, high chemical resistance can easily be provided to the seal plate.

Further, the seal plate according to the present invention can be completed only by dispersing the binder component in the base material of the woven and knitted fabric or nonwoven fabric before cutting the base material into a predetermined shape conforming to the shape of the track rail or the mobile block, and hence the seal plate corresponding to various movement guide devices can be produced easily at low cost.

BEST MODE FOR CARRYING OUT THE INVENTION

A seal plate for a movement guide device according to the present invention is now described in detail with reference to the accompanying drawings.

Figure 1:
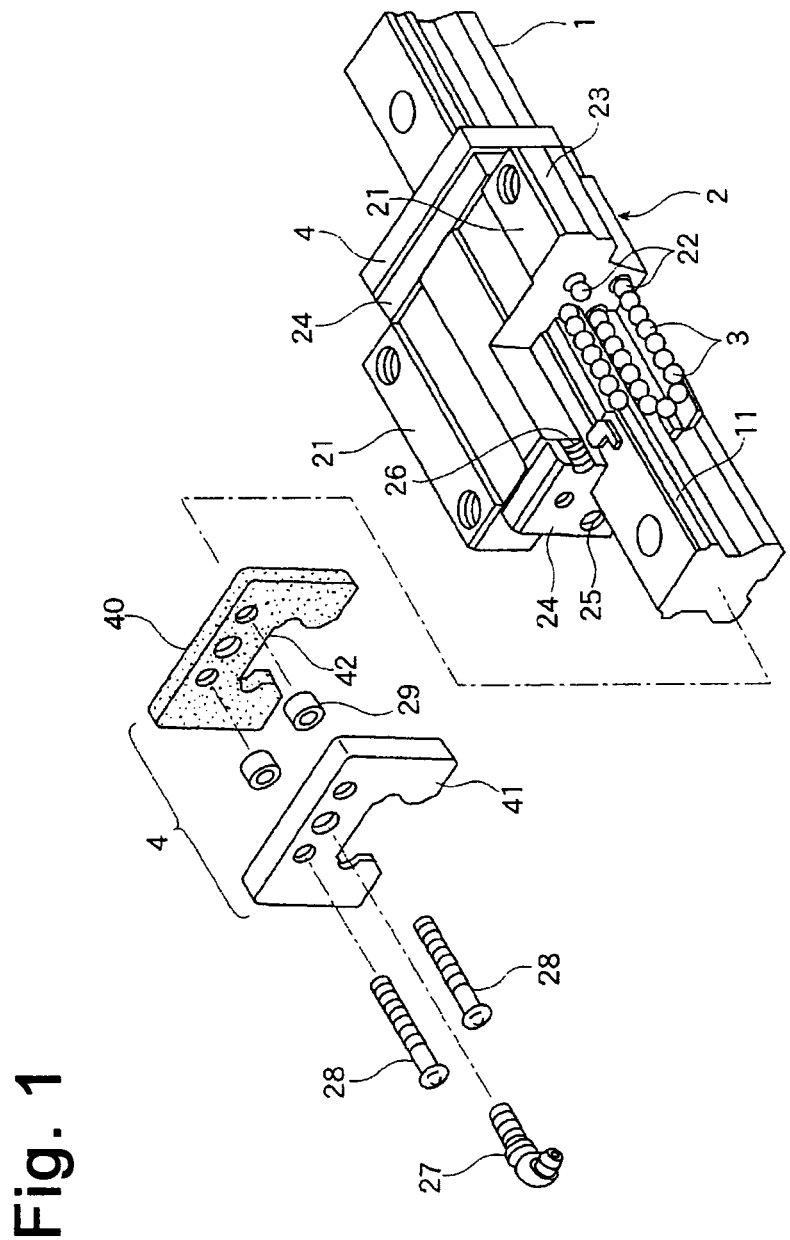
FIG. 1 is a perspective view illustrating an example of a movement guide device to which a seal plate according to the present invention can be applied.

FIG. 1 is an exploded perspective view illustrating an embodiment of the movement guide device having the seal plate according to the present invention mounted thereon. The movement guide device includes a track rail 1 which is linearly formed and has a rolling surface 11 for rolling elements formed thereon along a longitudinal direction, a mobile block 2 which is assembled to the track rail 1 via a plurality of balls 3 as the rolling elements and includes an endless circulation path for the balls, and seal members 4 which are mounted on both end faces of the mobile block 2 in a moving direction and in close contact with the track rail 1. The mobile block 2 is configured to reciprocate along the track rail 1 as the balls 3 circulate.

In addition, the mobile block 2 includes a block body 23 which has a mounting surface 21 for a mechanical device such as a table and also has ball return holes 22 for circulating the balls 3, and a pair of lid bodies 24 which are fixed to end faces of the block body 23. The lid bodies 24 have a direction changing path (not shown) of the ball 3 formed therein. The direction changing path scoops up the balls 3 from the rolling surface 11 of the track rail 1 so as to feed the balls 3 into the ball return holes 22 of the block body 23, and further feed the balls 3 from the ball return holes 22 into the rolling surface 11. The endless circulation path for the balls 3 is completed in the mobile block 2 by fixing the lid bodies 24 to the block body 23 by means of mounting bolts 25.

Further, an oil supply port 26 for feeding lubricating oil to the endless circulation path is provided in each of the lid bodies 24, and the oil supply port 26 is adapted to have a supply nipple 27 fitted thereto via the seal member 4.

Note that, although the track rail of the movement guide device is linearly formed in this embodiment, the track rail may be formed into an arc-shape of a constant curvature. In that case, the mobile block reciprocates in an arcuate manner along the track rail. In addition, the rolling elements interposed between the track rail and the mobile block are not limited to the balls but may be rollers.

Meanwhile, the seal member 4 is mounted on the mobile block 2 across each of the lid body 24 by means of fixing bolts 28. In order to prevent the seal member 4 from being collapsed due to tightening of the fixing bolts 28, bosses 29 corresponding to the thickness of the seal member 4 are fitted into the seal member 4, and the fixing bolts 28 are threaded through the bosses 29 into the mobile block 2.

Figure 2:
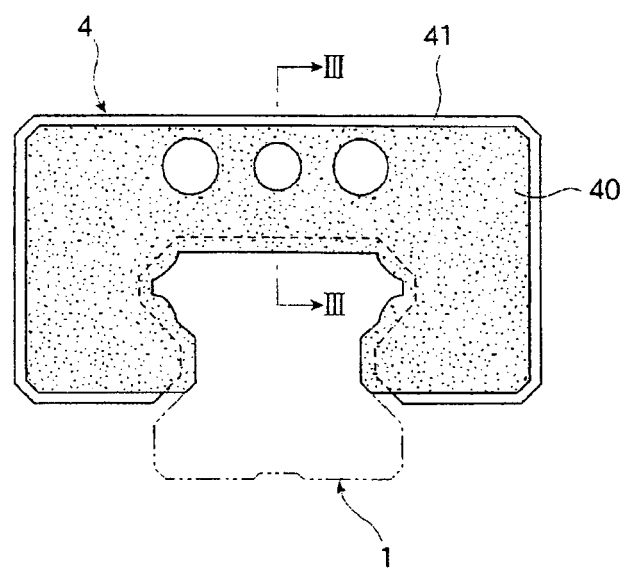
FIG. 2 is a front view illustrating a seal member including a housing which houses the seal plate according to the present invention.
Figure 3:
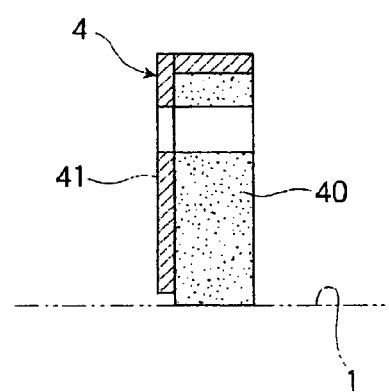
FIG. 3 is a cross-sectional view taken along the line III-III of FIG. 2.

As illustrated in FIGS. 1 to 3, the seal member 4 includes a seal plate 40, to which the present invention is applied and a housing 41 which houses the seal plate 40 and is fixed to the mobile block by means of the fixing bolts 28. The housing 41 is not in contact with the track rail 1. The seal plate 40 has a cutout portion 42 which fits onto the upper half of the track rail 1. The seal plate 40, under a state in which the seal member 4 is mounted on the mobile block 2, is in close contact with a surface of the track rail 1 without leaving any space so as to wipe off dust and foreign substances deposited on the track rail 1 as the mobile block 2 moves. The seal plate 40 also has a plurality of fine voids formed therein, and the fine voids are impregnated with lubricating oil. Consequently, as the mobile block 2 moves relative to the track rail 1, the seal plate 40 applies the lubricating oil to the surface of the track rail 1 little by little.

Note that, although the voids of the seal plate 40 are impregnated with the lubricating oil in this embodiment, the seal plate 40 may be used without being impregnated with the lubricating oil.

The seal plate 40 includes a base material of woven and knitted fabric or nonwoven fabric and a binder component which is dispersed in the base material and binds together fibers which form the woven and knitted fabric or nonwoven fabric.

As an example of the seal plate 40, the base material is made of an aramid fiber nonwoven fabric and the binder component is made of fluororubber. In respect of a specific method of manufacturing the seal plate 40, the base material made of the aramid fiber nonwoven fabric is first prepared, the base material is then impregnated with a solution containing a fluororubber compound dispersed in a solvent, and subsequently the fluororubber is cross-linked by polyol and the solvent is volatilized. The fluororubber used is a compound type of "Dyneon" (registered trademark) from Sumitomo 3M Limited, and the solvent used is methyl ethyl ketone. The seal plate 40 thus finished is cut out into the predetermined shape according to the shape of the track rail 1 and the shape of the housing 41, and housed in the housing 41 before being mounted on the mobile block 2 of the movement guide device.

Figure 4:
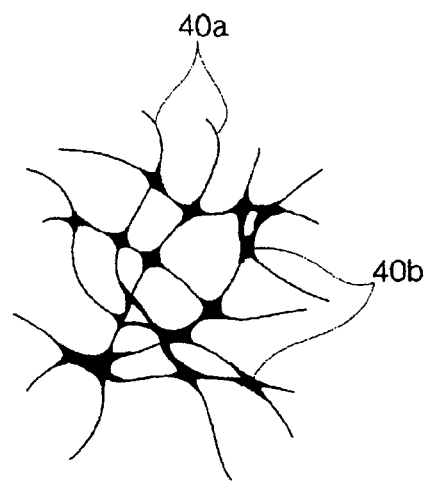
FIG. 4 is an enlarged view schematically illustrating the inside of the seal plate observed microscopically.

When the seal plate 40 thus manufactured is microscopically observed, as illustrated in FIG. 4, fibers 40a, which form the nonwoven fabric, are partially bound together by a binder component 40b, and the seal plate 40 has the plurality of voids formed therein as a result of the solvent being removed.

Thus, even if the seal plate 40 is brought into close contact with the track rail 1 so as to be in sliding contact with the track rail 1, the fibers of the nonwoven fabric constituting the base material are not undesirably ragged. Therefore, it is possible to prevent the seal plate 40 from deforming even in a long-term use, and to maintain close contact between the seal plate 40 and the track rail over a long period of time.

Anyone of the woven and knitted fabric and the nonwoven fabric may be used as the base material. Using the nonwoven fabric enables flexibility of the seal plate 40 manufactured to be improved. Further, if the woven and knitted fabric is used, the flexibility of the seal plate 40 can be arbitrarily adjusted by selecting a weaving pattern or a knitting pattern.

In the above-mentioned manufacture example, a weight ratio of the fluororubber to the solvent in the solution to be impregnated into the base material is set to 2:8. However, the weight ratio may be varied as appropriate depending on the flexibility required for the seal plate 40. For example, if the weight ratio of the fluororubber to the solvent is set to 1:9, the binder component dispersed in the base material is reduced and the flexibility of the nonwoven fabric constituting the base material is better maintained compared to the above-mentioned case so that the seal plate 40 can be made softer. As a result, close contact between the track rail 1 and the seal plate 40 and sealing performance can be improved.

In respect of the seal plate 40 according to the present invention, the seal plate 40 can vary in performance by appropriately selecting the fibers of the woven and knitted fabric or nonwoven fabric to be used for making the base material and the binder component 40b to be dispersed in the base material. For example, if the base material is made of aramid fibers and fluororubber is selected as the binder component 40b as described above, the seal plate 40 can obtain high heat resistance. As a result, it is possible to make the seal member 4 optimal for the movement guide device used in a high temperature environment of 200° C. or more. In this case, engineering plastic such as PEEK may be used as a material of the housing 41 which houses the seal plate 40.

Further, if it is desired to provide chemical resistance to the seal plate 40, the base material may be made of polyester fibers and hydrogenated nitrile rubber may be selected as the binder component 40b. According to such a selection, even if the movement guide device is used in an environment in which the movement guide device is wetted by a strong alkaline coolant liquid, it is possible to provide the seal member 4 which has enough durability with respect to the coolant liquid.

Thus, in consideration of heat resistance and chemical resistance, the base material is preferably made of aramid fibers, glass fibers, carbon fibers, poly(p-phenylenebenzobisoxazole) (PBO) fibers, and polyester fibers, and the base material may be made by mixing some of these kinds of fibers.

Further, in consideration of heat resistance and chemical resistance, the binder component 40b is preferably made of fluororubber, EPM, EPDM, hydrogenated nitrile rubber, silicone rubber, acrylic rubber, and butyl rubber, and the binder component 40b may be made by mixing some of these kinds of rubber.

Still further, thermoplastic resin may be used as the binder component 40b. For example, selecting polytetrafluoroethylene (PTFE) as the binder component 40b enables the seal plate 40 to have reduced sliding resistance without being impregnated with the lubricating oil.

In any case, appropriately selecting the fibers to be used for making the base material and the binder component 40b to be dispersed in the base material enables the seal plate 40 suited for various applications of the movement guide device to be easily manufactured.

Further, the seal plate 40 according to the present invention is completed by cutting out the sheet-like base material treated by using the binder component 40b into a shape conforming to the shape of the track rail 1 so that the seal plates 40 having different shapes and thicknesses can be easily manufactured, and the seal member 4 can be produced by a simpler method and at less cost than the conventional seal member.

The seal plate 40 according to the present invention may be mounted on the track rail 1 and used as it is, but the seal plate 40 has the plurality of voids formed therein, and hence the lubricating oil may be impregnated into the voids before using the seal plate 40. In that case, the movement of the mobile block 2 along the track rail 1 causes the seal plate 40 to apply the lubricating oil to the surface of the track rail 1, thereby enabling reduction in frictional resistance of the seal plate 40 relative to the track rail 1.

The void content in the seal plate 40 is not only influenced by the void content of the woven and knitted fabric or nonwoven fabric constituting the base material, but also varied depending on the dispersion amount of the binder component 40b in the base material. As the void content in the seal plate 40 becomes higher, the seal plate 40 can retain more lubricating oil. However, excessively high void content of the base material is prone to cause the seal plate 40 to deform, which in turn creates a need to disperse more of the binder component 40b in the base material in order to prevent the deformation.

The invention claimed is:

1. A seal plate, which is mounted on a mobile block which moves along a track rail and closes a gap between the mobile block and the track rail, the seal plate comprising:
    a base material of a woven and knitted fabric or nonwoven fabric; and
    a binder component which is dispersed in the base material and binds together crossing parts of fibers which form the woven and knitted fabric or nonwoven fabric, while maintaining a plurality of voids in the base material,
    wherein the seal plate is not impregnated with lubrication oil.

2. The seal plate according to claim 1, wherein the base material is made of one or more kinds of fibers selected from the group consisting of an aramid fiber, a glass fiber, a carbon fiber, a poly(p-phenylenebenzobisoxazole) (PBO) fiber, and a polyester fiber.

3. The seal plate according to claim 1, wherein the binder component is made of one or more kinds of rubbers selected from the group consisting of fluororubber, ethylene propylene rubber (EPM), ethylene propylene diene monomer rubber (EPDM), hydrogenated nitrile rubber, silicone rubber, acrylic rubber, and butyl rubber.

4. A movement guide device, comprising:
a plurality of rolling elements;
a track rail along which a rolling surface for the plurality of rolling elements is provided in a longitudinal direction;
a mobile block which is assembled to the track rail via the plurality of rolling elements; and
a dust-proof member which is mounted on the mobile block and seals a gap between the mobile block and the track rail,
wherein the dust-proof member comprises:
the seal plate according to claim 1, which is formed into a plate-like shape and has a working surface conforming to an outer shape of the track rail to come into sliding contact with the track rail on the working surface; and
a housing which houses the seal plate and is fixed to the mobile block.

5. The seal plate according to claim 2, wherein the binder component is made of one or more kinds of rubbers selected from the group consisting of fluororubber, ethylene propylene rubber (EPM), ethylene propylene diene monomer rubber (EPDM), hydrogenated nitrile rubber, silicone rubber, acrylic rubber, and butyl rubber.

* * * * *